B. F. SEYMOUR.
COMBINED RESILIENT BEARING AND TRANSMISSION.
APPLICATION FILED DEC. 3, 1919.

1,437,452.

Patented Dec. 5, 1922.
2 SHEETS—SHEET 1.

Inventor:
B. F. Seymour,

Att'y.

B. F. SEYMOUR.
COMBINED RESILIENT BEARING AND TRANSMISSION.
APPLICATION FILED DEC. 3, 1919.
1,437,452.
Patented Dec. 5, 1922.
2 SHEETS—SHEET 2.
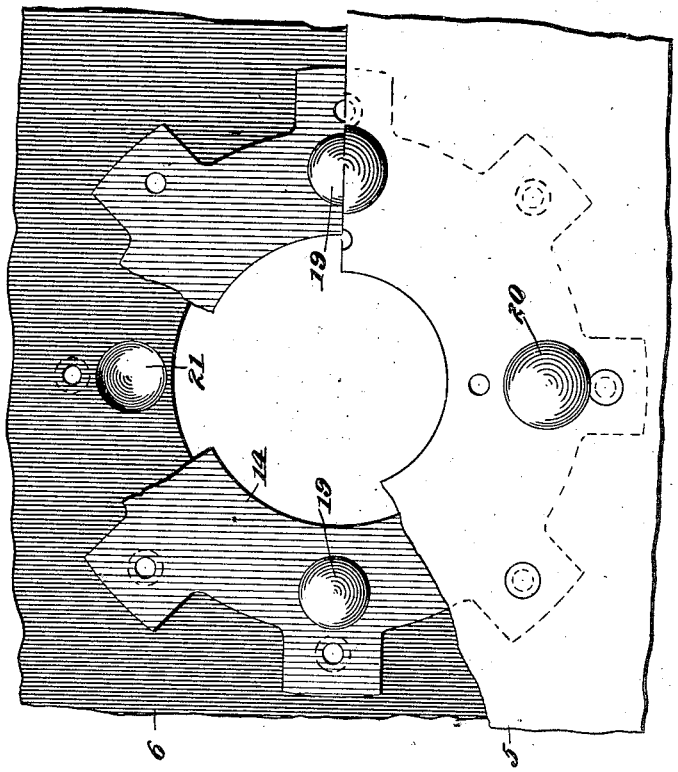
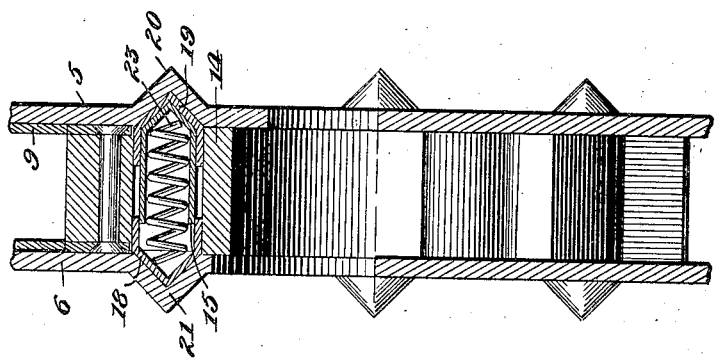
Inventor:
B. F. Seymour, Patented Dec. 5, 1922.

1,437,452

UNITED STATES PATENT OFFICE.

BENJAMIN F. SEYMOUR, OF WASHINGTON, DISTRICT OF COLUMBIA.

COMBINED RESILIENT BEARING AND TRANSMISSION.

Application filed December 3, 1919. Serial No. 342,283.

*To all whom it may concern:*

Be it known that I, BENJAMIN F. SEYMOUR, a citizen of the United States, residing at Washington, in the District of Columbia, have invented certain new and useful Improvements in Combined Resilient Bearings and Transmissions; and I do hereby declare the following to be a full, clear, and exact description of the invention, such as will enable others skilled in the art to which it appertains to make and use the same.

The present invention relates to resilient transmissions and bearings, more particularly for vehicle wheels, and consists in the combinations and arrangements of elements hereinafter described and particularly set forth in the accompanying claims.

The purpose of the invention is to provide a flexible or resilient transmission between a driving and a driven element adapted to positively transmit the driving force whether said elements are in or out of concentric relation; and one which will readily accommodate itself under all normal working conditions to which said elements may be subjected.

A further purpose of the invention is to provide a combined resilient transmission and bearing for a vehicle wheel to the end that such a wheel may possess the desired resilient qualities and also give the necessary transmission medium between the wheel proper and the motive power of the vehicle.

The construction shown herein is proposed as an improvement or other embodiment of the types of combined resilient transmission and bearing disclosed in my co-pending applications for United States patents bearing the Serial No. 302,414, filed June 7, 1919, Serial No. 302,415, filed June 7, 1919, Serial No. 302416, filed June 7, 1919, Serial No. 310,970, filed July 15, 1919, Serial No. 322,-627, filed Sept. 9, 1919, Serial No. 322,628, filed Sept. 9, 1919, Serial No. 330,374, filed Oct. 13, 1919, Serial No. 336,632, filed Nov. 8, 1919.

The arrangement shown herein is further characterized in that uniformly distributed and co-operable cone elements are provided for the driving and driven element to the end of obtaining equal and uniformly distributed pressure under all working conditions, whereby to obtain maximum efficiency and ease of operation.

Figure 2:
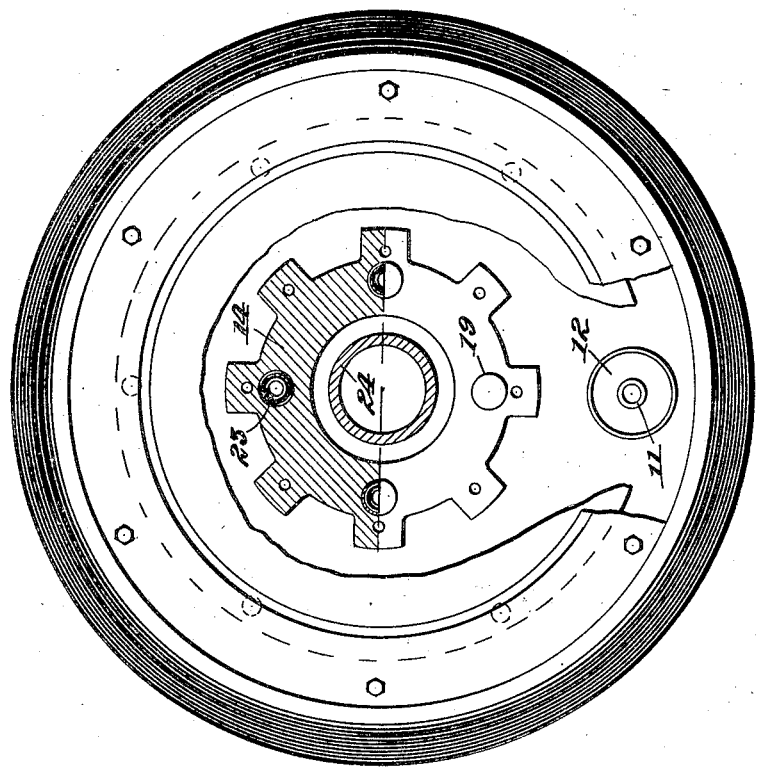
Figure 1:
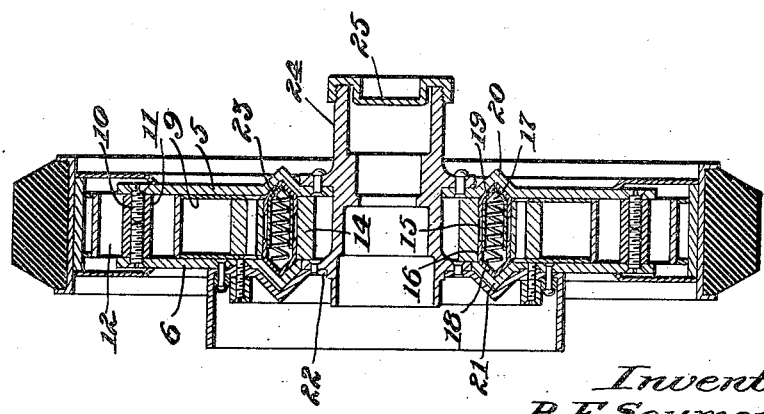

The invention is shown by way of illustration in the accompanying drawings wherein, Figure 1 is a central sectional view showing the application of the device to a vehicle wheel, Figure 2, a side elevational view thereof, Figure 3, an enlarged detail view, partly in section of the transmitting and bearing elements per se, and Figure 4 is a similar view thereof taken at right angles to Figure 3.

Referring to the construction in further detail and wherein like reference characters designate corresponding parts, the construction consists of a hub portion formed of two side plates, or housing members, 5 and 6 which are disposed against the inner rim portion 9 of the wheel, as shown. The two hub members 5 and 6 are secured to the wheel rim by the series of pairs of bolts 10 screwed into threaded sleeves 11 that serve as spacing elements and which are located within the spaces, or chambers, 12, as indicated in Figures 1 and 2. It will be understood, of course, that said spaces 12 are provided to allow the wheel rim to have limited radial movement with respect to the axle 13 of the wheel.

The resilient transmission and bearing device per se consists of an inner rim portion 14 provided with a plurality of cylindrical-shaped apertures adapted to receive and hold therein the several telescoping members 15 and 16 whose respective opposed ends 17 and 18 are cone-shaped, and said cone portion 17 is provided with an overlying conical portion 19 as shown. The said opposed cone elements enter complementary-shaped recesses 20 and 21 formed on the inner portions of the side plates 5 and 6, and an overlying or reinforcing plate 22 is secured to said side plate portion 21 and is formed with cone-shaped recesses to receive the corresponding recesses 21 of said side plate.

A spring 23 is located within each of the telescoping elements (15 and 16) and acts to normally distend or hold said elements in close contact with their respective cone elements on the side plates whereby to resiliently resist relative motion in a radial or angular direction between the hub proper and wheel rim as will be understood.

It will therefore be seen from the foregoing that any motion or shock of the shaft or axle will transmit a like movement to the wheel hub through the medium of the coacting cones, and that such transmission will be flexible or resilient in nature. And it will be further seen that any jarring motion imparted to the wheel will be resiliently taken up by the co-operating cone elements together with the spring.

It is obvious that those skilled in the art may vary the details of construction and arrangement of parts without departing from the spirit of my invention, and therefore, I do not wish to be limited to such features except as may be required by the claims.

Having thus described my invention what I claim as new is:—

1. In a combined resilient bearing and transmission for vehicle wheels the combination of, a hub portion having side plates, a wheel rim mounted to have limited radial movement between the side plates; a plurality of telescoping and axially movable cone elements mounted on the inner portion of the wheel rim, and opposed cone elements formed within the side plates receiving and co-operable with said axially movable cone elements, substantially as set forth.

2. In a combined resilient bearing and transmission for vehicle wheels, the combination of, a hub portion having side plates, a wheel rim mounted to have limited radial movement between the side plates, and having a plurality of cylindrical recesses on the inner portion thereof; hollow telescoping members having opposed cone shaped ends mounted to have axial movement in said recesses, springs tensioning said telescoping cone members, and cone shaped recesses formed within the side plates receiving said cone shaped ends and co-operable therewith, substantially as set forth.

In testimony whereof I affix my signature.

BENJAMIN F. SEYMOUR.